United States Patent [19]

Wheeler et al.

[11] Patent Number: 5,070,407
[45] Date of Patent: Dec. 3, 1991

[54] FILTER CHANGING MECHANISM FOR A VIDEO CAMERA

[76] Inventors: Ernest E. Wheeler; William M. Wheeler; David C. Wheeler, all of 5358 Caminito Velasquez, San Diego, Calif. 92124; Thomas D. Henderson, 50 Rockwood, Irvine, Calif. 92714

[21] Appl. No.: 522,092
[22] Filed: May 11, 1990
[51] Int. Cl.5 .................... G02B 13/16; H04N 5/225
[52] U.S. Cl. ..................................... 358/225; 359/889
[58] Field of Search ........... 358/225, 227, 228, 213.13, 358/42, 909; 354/195.12, 295, 101, 102, 450; 350/315

[56] References Cited

U.S. PATENT DOCUMENTS

| 3,377,427 | 4/1968 | Fischer | 350/315 |
| 3,515,800 | 6/1970 | Ebihara et al. | 358/42 |
| 4,113,359 | 9/1978 | Koike et al. | 350/315 |
| 4,316,659 | 2/1982 | Daniels | 354/126 |
| 4,727,413 | 2/1988 | Miura et al. | 358/161 |
| 4,805,028 | 2/1989 | Nishioke et al. | 358/225 |
| 4,827,348 | 5/1989 | Ernest et al. | 358/909 |
| 4,870,496 | 9/1989 | Fantone | 358/225 |

Primary Examiner—Ian J. Lobo
Attorney, Agent, or Firm—Frank D. Gilliam

[57] ABSTRACT

In a video camera using a silicon diode tube or a similar acting light sensitive solid state pickup element as a light image sensing device, a light control device which detects light in the visual spectrum and upon receipt of visual spectrum light operates a mechanical switching device which positions a Cut I-R filter in front of the image sensing device for visual light illuminated objects and positions a optical or neutral density filter in front of the image sensing device in the absences of any visual light for detection of infra-red light illuminated objects. Different filters can be substituted for other illuminating light frequencies.

14 Claims, 2 Drawing Sheets

FILTER CHANGING MECHANISM FOR A VIDEO CAMERA

BACKGROUND OF THE INVENTION

In the present state of the art most television camera manufacturers install a fixed "Cut I-R filter" between the camera lens and the target light sensing element of the tube or chip image sensing device. This has resulted in an increase in the resolution of both the colored and black and white television camera.

However, this method for improving camera resolution has greatly reduced or eliminated some very desirable characteristics of both television colored and black and white cameras to the degree that these state of the art cameras are only equal in performance to the old trisulfide type cameras.

The installation of the fixed "Cut I-R filters" in the new tube and chip cameras has greatly reduced the dynamic light range and eliminated all camera response in the invisible near infra-red region of the electro-magnetic spectrum. This fixedly installed filter renders both colored and black and white cameras unable to operated in the invisible near infra-red region.

The fixed Cut IR filters are installed in the new generation cameras to improve resolution and the grey scale only as the new silicon diode tubes and chips are virtually impervious to target burns from bright light. These now fixed on place Cut IR filters greatly reduces the ability of the camera system to process multi-light spectrum video signals.

There has not been a suitable way to employ the state of the art video cameras for detecting and processing multi-light spectrum video signals until the emergence of the instant invention.

SUMMARY OF THE INVENTION

The present invention is directed to the automatically position a selected any one of two or more filters between the lens and the raster light sensing element of tube or chip element of a video camera. When light in the visual spectrum illuminates the camera's field of vision a Cut IR filter is positioned in front of the camera image pickup element and when light in the infra-red spectrum illuminates the camera's field of vision a optical or neutral density filter is positioned in front of the camera raster image pickup element. Additional different frequency filters may be placed in front of the camera image pickup means if illumination of the camera's field of vision is by additional different specific light frequency, such as for example, light in the X-ray spectrum. Other filters such as, for example, optical flat filters, polarizing filters, fresnel lens, meniscus filters, achromatic lens, narrow band pass filters, magnifying lens, condensing lens, etc.

Several different embodiments of lens positioning means are hereinafter presented. In general, the devices of the invention includes at least two different light frequency filters to accommodate visual and infra-red light spectrum illumination. The two filters are positioned by mechanical means operated by an electronic circuit which is actuated by change in the camera's field of vision. A common electronic circuit is used in all embodiments. The electronic circuit includes an auto light control assembly which when detecting visual light operates a electro/mechanical device that mechanically places a Cut IR filter in front of the camera light image pickup element. In the absence of visual light, i.e. darkness, a second filter such as an optical or neutral density is moved in front of the camera light image pick up element whereby the camera can detect an infra-red illuminated field of vision. When visual light returns, the reverse occurs positioning the Cut IR filter neutral density filter in front of the image pickup element of the camera.

In a one embodiment a motor or solenoid is caused to rotate a filter retainer plate which accommodates at least two different light frequency filter lens. The available light sensing circuit operates the motor or solenoid in a directional manner through an angle of rotation which positions the required lens in front of the imaging pickup of the camera, i.e. for visual light a Cut IR filter and in the presence of an optical or neutral density. A third filter could be added to the filter retainer plate if desired.

In another embodiment a linear actuator translates a lens retainer carrying at least two different light frequency lens across in front of the imaging element of her camera. The light sensing circuit determines which lens is positioned in front of the imaging element of the camera. In the presence of visual light a Cut IR filter is pulled in front of the camera imaging element by the linear actuator. The opposite side of the lens retainer is attached to a coil spring which is loaded or extended when the actuator pulls the Cut IR filter in position for visual light illumination. This spring biases the lens retainer against the pull of the linear actuator. When darkness occurs, i.e. the absence of natural light illumination, the actuator becomes inoperative allowing the spring to translate the lens retainer positioning a second filter lens in front of the imaging element of the camera, i.e. an optical or neutral filter lens or the like. The reverse occurs when visual light is again present.

In another embodiment a linear or rotary cable system transfers the filter lens retainer in one direction and a similar spring as before mentioned transfers the filter lens retainer in the opposite direction.

An object of the invention is to provide an automatic means to position a filter or specific lens in front of the raster imaging element of a video camera that accommodates the illumination light frequency of the field of vision of the camera imaging element.

Another object of this invention is to automatically provide optimum filtering in colored television cameras.

Another object of this invention is to restore the dynamic range of both colored and black and white television cameras by automatically employing the proper filter for any give light condition.

Still another object of this invention is to restore the sensitivity in the invisible near infra-red region of the light spectrum by automatically removing and replacement of filters in a video camera lens light path in both colored and black and white television cameras.

Other objects and features of the invention will become apparent as the drawings which follow are understood by reading the corresponding description thereof.

BRIEF DESCRIPTION OF THE DRAWING FIGURES

DETAILED DESCRIPTION OF THE PREFERRED EMBODIMENTS OF THE INVENTION

Referring now to the various drawing Figures which depict the elements and operation of the present invention. Referring nos particulary to drawing FIGS. 1-4 which show a first embodiment of the invention including a filter lens transfer mechanism 10 and a light sensing circuit 12 for operating the lens transfer system.

Figure 1:
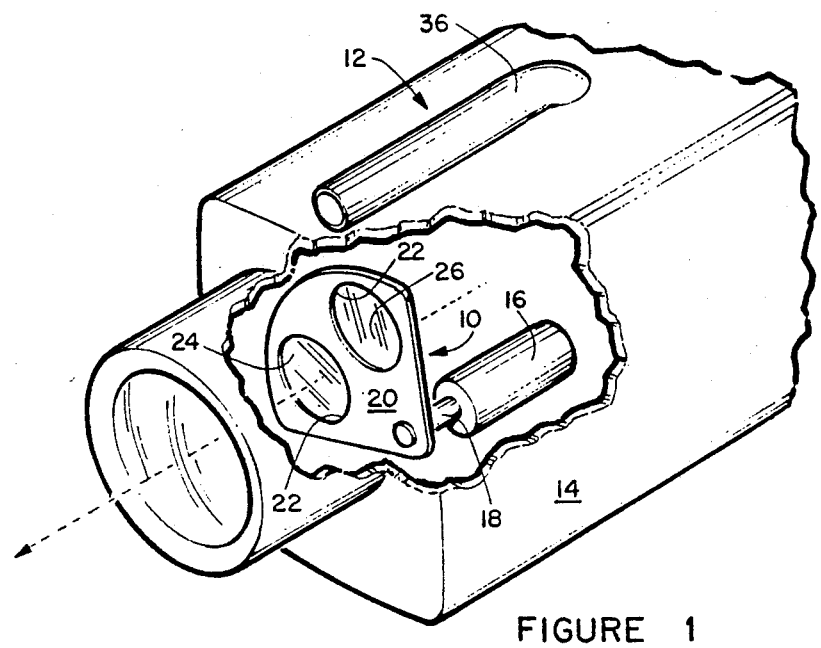
FIG. 1 is a cutaway perspective schematic showing of a typical video camera including the filter transfer system of the present invention.

In drawing FIG. 1 a portion of a video camera 14 in cutaway is shown. A lens transfer mechanism 10 which includes a motor or solenoid 16 typically a motor model B81482, manufactured and supplied by N. A. Philips or a solenoid model 1198 manufactured by AM design. The motor or solenoid has a rotatable shaft 18 which is caused to rotate under certain camera illuminating lighting, herein after described in more detail. Fixedly attached to the distal end of the shaft 18 is a filter lens retainer 20 which includes apertures 22 for receiving and holding a pair of filter lens 24 and 26. For example filter lens 24 may be a neutral density filter or the like and filter lens 26 may be a Cut IR filter lens.

Figure 3:
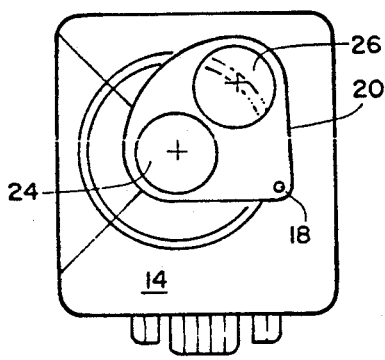
FIG. 3 is a showing of the front of the video camera of FIG. 1 with a first filter positioned for use.
Figure 4:
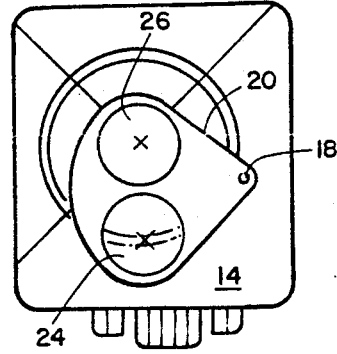
FIG. 4 is a showing of the front of the video camera of FIG. 1 with a second filter positioned for use.

Drawing FIGS. 3 and 4 depict the two positions of the lens retainer 20. In drawing FIGS. 1 and 3, the neutral density filter lens 24 is shown in position for camera use. In drawing FIG. 4, the Cut IR filter lens 26 is shown in position for camera use.

Figure 2:
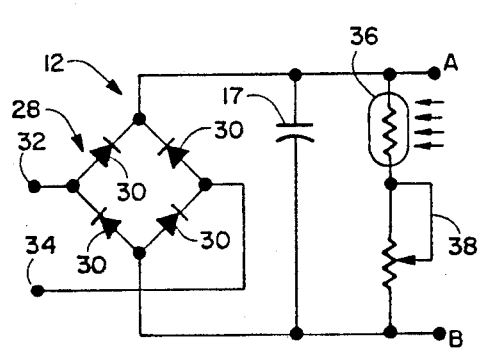
FIG. 2 is a showing of a schematic circuit for automatically transferring the filter retainer for placement of a desired filter in position for use in front of the raster imaging element of the camera.
Figure 2A:
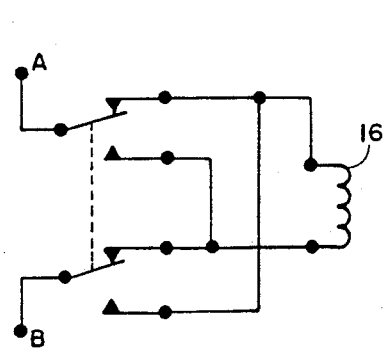
FIG. 2a is a switching circuit used with the circuit of FIG. 2 in the operation of the first embodiment of the invention.

Referring now specifically to drawing FIGS. 2 and 2a which depict circuits for use in actuating the motor or solenoid 16. The circuit includes a full wave rectifier 28 which includes a plurality of diodes 30. Either 12, 24 or 117 volts can be applied to the full wave rectifier at terminals 32 and 34. The rectified power is filtered by capacitor 17 of approximately 10 Micro farads. Power is supplied to a light sensing element 36 an auto light control assembly 2E474 distributed by W. W. Granger and a series potentiometer 38 of approximately 45K ohms in parallel with the capacitor 17 between the + and − output of the rectifier. Power is also supplied through a pair of in series a bi-metal switches 40 of the type that have a normally open and a normally closed switch contacts wired as shown in drawing FIG. 2a.

In operation, camera field of vision illumination by light in the visible spectrum causes the light sensing element 36 to translate the switch to open a first set of normally closed contacts and close a second set of normally open which causes the motor or solenoid to rotate in a first direction for rotating the cut IR filter 26 out of position in front of the image sensing element of the camera, see drawing FIG. 4, and rotate the neutral density filter 24 into a position in front of the image sensing element of the video camera. In the absence of visible light in the camera's field of vision the sensor 38 causes the bi-metal switch to return to its normal inactivated condition causing the motor or solenoid to rotate in the opposite direction positioning the optical neutral density filter back in front of the imaging sensing element of the camera. The return of visual light again reverses the motor or solenoid direction of rotation repositioning the filters. Microswitches or the like (not shown) are positioned to stop the rotation in of the motor/solenoid in the proper lens placement position in either direction.

Figure 2B:
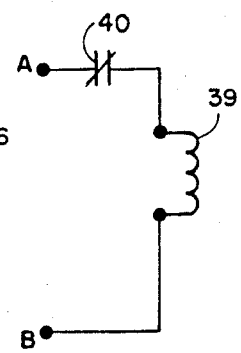
FIG. 2b is a switching circuit used with the circuit of FIG. 2 in the operation of the remaining embodiments of the invention.
Figure 5:
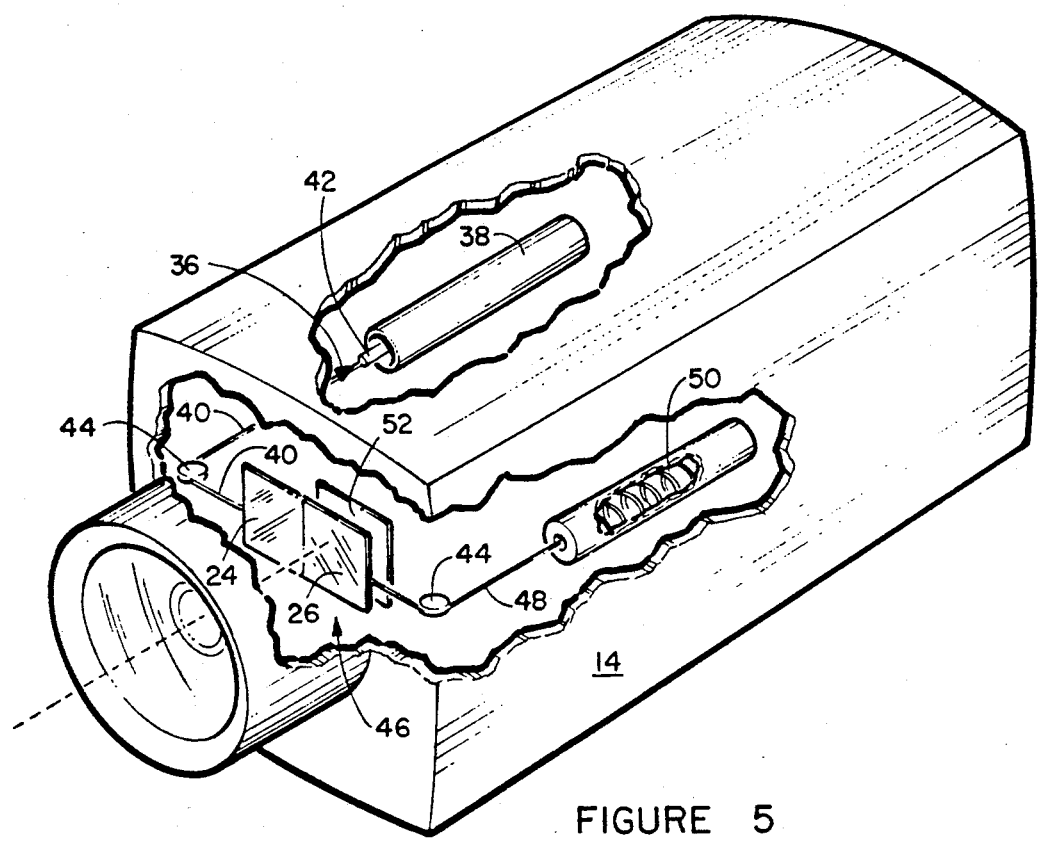
FIG. 5 is a cutaway schematic showing of a video camera with a second embodiment of the filter lens transfer system of the invention.

Referring now specifically to drawing FIG. 5 which depicts a second embodiment of the present invention. In this embodiment a pair of filter lens 24 and 26 are translatable linearly in front of the imaging element of the camera 14. The translation is preformed in the direction of arrow 36 by a linear solenoid 38 of the type 13723 manufactured by American Design Components. The solenoid is energized by the circuit of FIG. 2 and the circuit shown in FIG. 2b. A stainless steel wire 40 is connected to the solenoid translating member 42 at one end, around a pulley or guide wheel 44 and to one side of a lens carrier 46. The other side of the lens carrier is connected by a length of stainless wire 48 around a second pulley or guide wheel 44 to a coil spring 50 which is extended in a biasing manner when the Cut IR filter lens 26 is in position in front of the camera imaging element 52 and relaxed when the neutral density filter lens 24 is in position in front of the imaging element 52 of the camera.

In the presence of visible light the solenoi 38 is energized and the translating member 42 translates along arrow heads 36 pulling the wire 40, the lens carrier 46, wire 48 and stretching coil spring 50 to a lens carrier biased position as shown in drawing FIG. 5. When the visible light is no longer detected the linear actuating solenoid 38 is de-energized causing the translating member 42 to be pulled in a direction against the direction of arrow head 36 by the bias of coil spring 50 thereby placing the neutral density filter in front of the camera imaging element 52, when visual light again present to sensor 36, see drawing FIG. 1, returns the operation is reversed.

Figure 6:
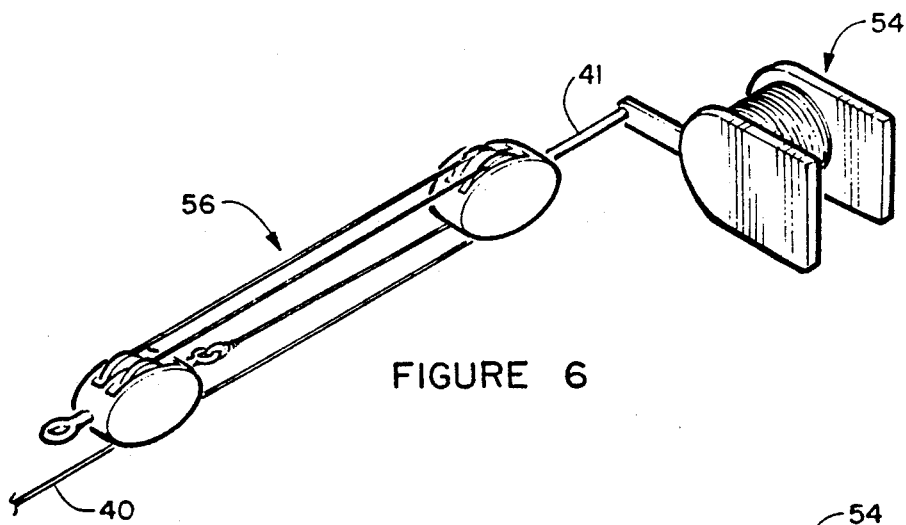
FIG. 6 is a second embodiment of the filter lens transfer system of the second embodiment of the invention.
Figure 7:
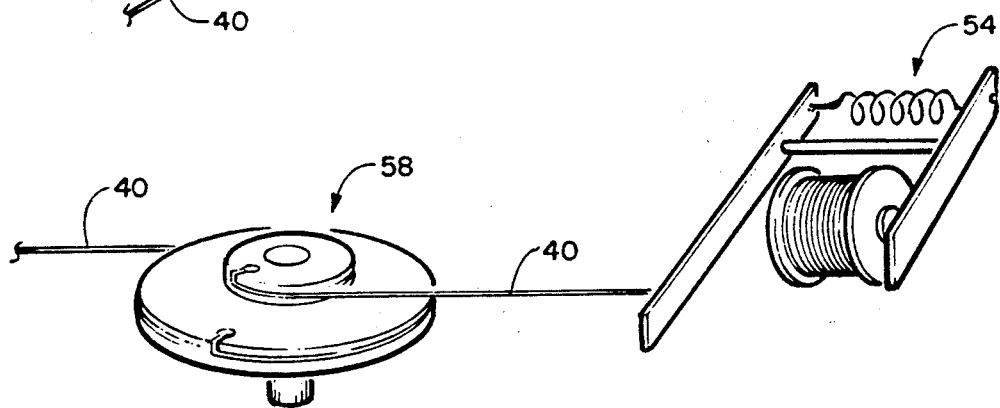
FIG. 7 is a third embodiment of the filter lens transfer system of the second embodiment of the invention.

Drawing FIGS. 6 and 7 depict alternate embodiments of the lens translating means of FIG. 5. In the drawing FIG. 6 embodiment the automatic filter control operation remains the same as discussed above. The solenoid a relay 54 of a type 2026 manufactured by Potter Brumfield or and equivalent thereto is attached to a miniature pulley assembly 56 of a type 3434T11 manufactured by McMaster-Carr Supply Company or and equivalent thereto. The operation of the relay fixed arm 41 causes the pulley assembly to take up steel wire 40 which translates the lens carrier and loads the spring 50 in the same manner as above mentioned. In the drawing FIG. 7 embodiment a pulley drive tensioner 58 of the type 5984K31 distributed by McMaster-Carr Supply replaces the miniature pulley assembly and in operation the rotation of the wheel caused by the translation of the reed of the relay winds the steel wire 40' on the reel which translates the wire along arrow head 36 translating the filter carrier as herein before discussed. A spring 50 serves the same purpose in the drawing FIG. 6 and 7 embodiments.

While there have been shown and described preferred embodiments of automatic filter lens transfer system in accordance with the invention, it will be appreciated that many changes and modifications may be made therein without, however, departing from the essential spirit thereof.

What is claimed is:

1. An automatic filter control system for a video camera having an image sensing element comprising:
   a linear translating filter lens carrier;
   at least two different light frequency filters carried by said filter lens carrier; and
   filter lens carrier transfer mechanism for automatically transferring said filter lens carrier depending on the frequency of illumination viewed by said image sensing element for positioning only a selected one of said at least two different light frequency filters carried thereby in front of said image sensing element.

2. The invention as defined in claim 1 wherein said filter lens carrier is a rotating member.

3. The invention as defined in claim 2 wherein said filter lens carrier transfer mechanism is a motor solenoid.

4. The invention as defined in claim 1 wherein one of said at least two different light frequency filters is a neutral density filter.

5. The invention as defined in claim 1 wherein one of said at least two different light frequency filters is a Cut IR filter.

6. The invention as defined in claim 1 wherein one of said at least two filters is an optical flat filter.

7. The invention as defined in claim 1 wherein one of said at least two filters is a polarizing filter.

8. The invention as defined in claim 1 wherein one of said at least two or more filters is a fresnel lens.

9. The inventor as defined in claim 1 wherein one of said at least two filters is a meniscus lens.

10. The invention as defined in claim 1 wherein said at least one of said at least two filters is a achromatic lens.

11. The invention as defined in claim 1 wherein one of said at least two filters is a narrow band pass filter.

12. The invention as defined in claim 1 wherein one of said at least two filters is a magnifying lens.

13. The invention as defined in claim 1 wherein one of said at least two filters is a condensing lens.

14. An automatic filter control system for a video camera having an image sensing element comprising:
    a filter lens carrier;
    at least two different light frequency filters carried by said filter lens carrier; and
    filter lens carrier transfer mechanism for automatically transferring said filter lens carrier depending on the frequency of illumination viewed by said image sensing element for positioning only a selected one of said at least two different light frequency filters carried thereby in front of said image sensing element wherein said filter lens carrier transfer mechanism is a pulley assembly.

* * * * *